March 1, 1955 M. T. HALE 2,702,941
TWINE CUTTER WITH REMOVABLE BLADE
Filed Nov. 19, 1952
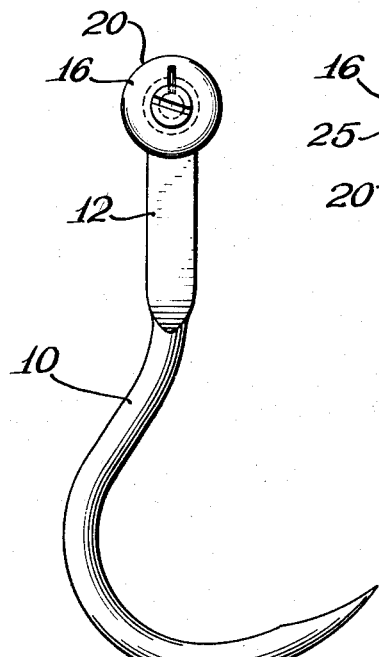
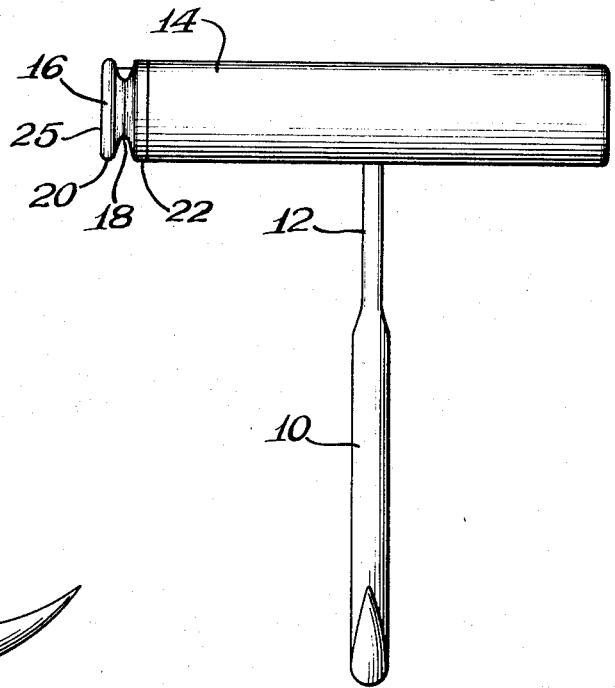
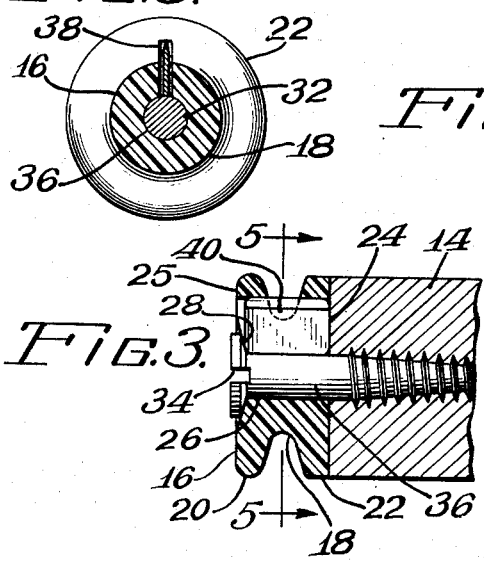
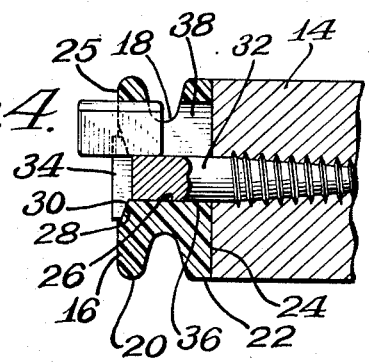
Inventor:
Myron T. Hale
By Darrell P. Horton
Atty.

2,702,941
TWINE CUTTER WITH REMOVABLE BLADE

Myron T. Hale, Wilmington, Ohio

Application November 19, 1952, Serial No. 321,323

2 Claims. (Cl. 30—289)

My invention relates to an improvement in twine cutter with removable blade and in particular to a hay hook which contains provision for cutting binder twine.

Among the many uses of hay hooks on farms, one is to move bales of hays from storage areas to feeding areas where the bales are opened and the hay distributed for the animals to feed on. The removal of the twine or wire from the bales frequently involves quite a tussle, bouncing the bales around and trying to kick the center out of the bale while continuing to hold on to the binding material. Furthermore, the opening of bales on a cold morning, digging down through the hay into which the twine or wire has cut usually rather deeply is an unpleasant and frequently somewhat painful job. My invention is directed to the more convenient opening of twine tied bales.

One object of my invention therefore is the provision of cutting means on a hay hook whereby binder twine on bales of hay or straw may be easily cut.

Another object of my invention is the provision of such cutting means which are amply shielded in such fashion that the employment of the hay hook so equipped offers no chance of injury to the person using the hay hook.

Still another object is the provision of such shielded means so that the edge of the cutting means is well protected against dulling injury.

Still another object of my invention is the provision of such cutting means on a hay hook so that the hand position on the hay hook need not be changed as between using the hook itself and the cutting means.

Yet another object of my invention lies in providing such cutting means by the employment of ordinary razor blades and the provision of means whereby the blades may be readily changed and at the same time may be securely locked in position so as not to be lost in use.

Still another object of my invention is the provision of all of the above objects and advantages at exceedingly low cost with very simple structure.

Other objects and advantages of my invention will be apparent from the following description and drawings of which:

Fig. 1 is a side elevation of a hay hook having an embodiment of my twine cutting device secured to the handle thereof;

Fig. 2 is a front elevation of the hay hook;

Fig. 3 is an enlarged vertical section of the left hand end of the handle of Fig. 2;

Fig. 4 is a view similar to Fig. 3 showing however the method by which the cutting edge may be changed; and Fig. 5 is a section which may be considered as being taken generally along the line 5—5 of Fig. 3 looking in the direction of the arrows.

My invention is to be incorporated in an ordinary hay hook shown in Figs. 1 and 2 which consists in general of a hook 10 having a shank 12 which is secured centrally to a substantially cylindrical wooden handle 14.

The embodiment of the twine cutter illustrated here comprises a shouldered, spool-shaped holder 16 having a relatively deep and narrow throat 18 between the shoulders 20 and 22. The outer face 24 of the shoulder 22 lies flat against an end of the handle 14 and the periphery of the shoulder is substantially flush with the cylindrical surface of the handle so constituting, in effect, a continuation of the handle and avoiding any roughnesses on the surface of the handle which might cause uncomfortable manipulation. The outer shoulder 20 has approximately the same diameter as the inner shoulder 22 and likewise has a flat outer face 25. This shoulder 20 should be narrow to facilitate picking up the binder twine. The holder has a central axial hole 26 formed therein which is countersunk 28 at its outer end to receive the head 30 of a screw 32. The screw 32 is a conventional wood screw except that the cross slot 34 may be deepened to approximately the shank 36 for purposes to be brought out later. A slit 38 is formed in the holder 16 to extend radially outward from the central hole 26 through the full thickness of the holder to a depth about midway between the bottom of the throat 18 and the top of the shoulders 20 and 22.

My invention further contemplates the use of the standard single-edge, narrow, rather thick razor blade 40 about a half inch portion of which is broken off for use in the twine cutter. The depth of the slit 38 is such that this segment of the blade may be inserted therein with the back of the blade resting against the shank 36 of the screw and the cutting edge of the blade being supported at either end against the end portions of the slit 38 in the shoulders and the central portion thereof being exposed in the throat 18 of the holder.

The friction as between the countersunk portion 30 of the holder 16 and the head of the screw is substantially less than that between the screw threads and the handle of the hook. Therefore, the holder may be screwed down relatively tightly on the handle so as to prevent any fortuitous turning but at the same time may be turned deliberately without difficulty. The slot in the head of the screw should preferably be turned so that it is out of parallel with the shank 12 of the hook. To insert the blade then, the holder is turned so that the slit 38 and the enlarged screw slot 34 are in alignment. The section of razor blade 40 may then be inserted through the slot of the screw into the holder. The holder is then turned back so that the section of blade is positioned approximately 180° with respect to the shank 12 of the hay hook. This angular position is the position which I have found most comfortable and convenient in the handling of hay bales but it will be readily understood that any user of my hook may alter the position of the blade to suit his own convenience. If the slit should happen to align with the cross slot in the screw at the position of preferred use, the screw may easily be turned slightly in one direction or the other to provide for the retention of the blade section at that particular desired point.

The dimensions of the illustrated embodiment of the cutter are of interest in view of the protection to the cutting edge and user's hand. The diameter of the hay hook handle is slightly in excess of 1" and therefore the holder shoulders 20 and 22 are of like diameter. The width of the holder is about ½" and the diameter of the throat is about ⅝". The length of the exposed portion of the blade upwardly of the throat is about 3/16", and the distance which the cutting edge of the blades lies inward of the outer edge of the shoulders is likewise about 3/16". It will be seen from these dimensions and from the proportions apparent in the illustrations that the cutting edge of the blade is set well down under the peripheries of the shoulders and that only a small portion thereof is exposed which I have found, as a pragmatic determination, affords complete protection to the hand. The inwardly sloping edges of the shoulders to the throat guide the binder twine to the blade. An entirely sufficient length of blade edge is exposed to cut easily and even, to some extent, saw the twine.

It will be understood that the embodiment here described is but one embodiment of my invention. There is a wide range of equivalents possible in the practice thereof. The word "twine" has been used throughout as the binding material but it will be understood that by this term is meant any binding material which is capable of being cut by a knife edge. Likewise, it should be understood that while the embodiment described herein is applied to a hay hook, it will find ready use on similar implements used not only in handling hay but bales, boxes and packages of many other materials. So, too, when the word spool has been used it need not necessarily be limited to an element having a completely circumferential groove since a groove extending less than around the complete circumference would be quite satisfactory.

I claim:
1. A twine cutter comprising a cylindrical handle, a blade having a cutting edge, a spool-shaped blade holder having a narrow throat, said holder having an axial hole therethrough for attachment to said handle and a longitudinal slit extending from said hole through the bottom of said throat, and fastening means including a head and shank securing said holder to said handle, the head thereof being notched through at one point, said slit containing said blade with a portion of said cutting edge exposed in the bottom of said throat and the back of the blade against the shank of said fastening means and one end of said blade against said handle, said holder being stiffly rotatable on said fastening means to bring said slit into register and out of register with said notch.

2. A twine cutter comprising a cylindrical handle, a blade providing a cutting edge and means for holding said blade with said cutting edge extending outward from said end of said handle and exposing a small portion of said cutting edge substantially inside the extended cylinder surface of the end of said handle, said means including a blade holder extending approximately to the extended cylinder surface, longitudinally slotted to contain said blade and grooved transversely on the exterior thereof through said slot to provide for said exposure of said blade portion, said holder having a bore therethrough on the back edge of said slot and fastening means including a head and a shank extending through said bore to secure said holder to said handle, the head thereof being notched through at one point, said holder being stiffly rotatable on said fastening means to bring said slot out of register with said notch to hold said blade in said slot.

References Cited in the file of this patent
UNITED STATES PATENTS

| | | |
|---|---|---|
| 241,594 | Bickelhaupt | May 17, 1881 |
| 740,339 | Tumelty | Sept. 29, 1903 |
| 877,619 | Vasey | Jan. 28, 1908 |
| 1,077,665 | Barnard | Nov. 4, 1913 |
| 1,199,659 | Black | Sept. 26, 1916 |
| 1,298,501 | Hawkes | Mar. 25, 1919 |
| 1,878,980 | Bell et al. | Sept. 20, 1932 |
| 2,475,324 | Jaske | July 5, 1949 |
| 2,486,900 | Willis | Nov. 1, 1949 |
| 2,494,439 | Gorka | Jan. 10, 1950 |